UNITED STATES PATENT OFFICE.

RICHARD KOTHE, MORITZ ULRICH, AND OSCAR DRESSEL, OF ELBERFELD, GERMANY, ASSIGNORS TO THE FARBENFABRIKEN, VORMALS FR. BAYER & CO., OF SAME PLACE.

BLUE DYE.

SPECIFICATION forming part of Letters Patent No. 511,532, dated December 26, 1893.

Application filed September 30, 1893. Serial No. 486,892. (Specimens.) Patented in France March 10, 1893, No. 228,510.

*To all whom it may concern:*

Be it known that we, RICHARD KOTHE, MORITZ ULRICH, and OSCAR DRESSEL, doctors of philosophy and chemists, subjects of the Emperor of Germany, residing at Elberfeld, Germany, (assignors to the FARBENFABRIKEN, VORMALS FR. BAYER & CO., in Elberfeld,) have invented a new and useful Improvement in the Manufacture of New Substantive Blue Coloring-Matters, (for which the FARBENFABRIKEN, VORMALS FR. BAYER & CO., has obtained Letters Patent in France, dated March 10, 1893, No. 228,510,) of which we give in the following a clear and exact description.

Our invention relates to the manufacture of coloring-matters giving blue to greenish-blue shades on unmordanted cotton and deriving from one molecular proportion of the tetrazo compound of para diamins (as for example: benzidin, tolidin, dianisidin) and two molecular proportions of amidonaphtholdisulfo acid

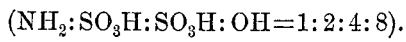
$(NH_2:SO_3H:SO_3H:OH=1:2:4:8)$.

This acid can be prepared advantageously according to the following directions: one hundred parts, by weight, of the acid sodium salt of alphanaphthylamin-disulfo acid

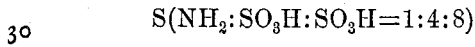
$S(NH_2:SO_3H:SO_3H=1:4:8)$ are gradually stirred into four hundred parts, by weight, of fuming sulfuric acid (containing forty per cent. of anhydrid). On heating at from 80° to 90° centigrade the mixture solidifies, a solid white mass being formed. Heating is continued, until a test portion taken out and diluted with water no longer yields a diazo compound and the former no longer reacts with diazobenzene sulfo acid to form a dye-stuff. The reaction being complete, the mixture is introduced into ice-water, and lime water is then added, until the mass shows an alkaline reaction. After filtering off the gypsum, the resulting filtrate is in the well known manner mixed with a solution of sodium carbonate. After filtering off the calcium carbonate the filtrate obtained is evaporated. On adding alcohol to the resulting hot concentrated solution of the sodium salt the latter salt separates almost entirely after cooling in the form of brilliant yellow leaves which contain water of crystallization and can be easily crystallized from diluted alcohol. According to our analytical researches the above sodium salt (when dried at 160° centigrade) has the following composition:

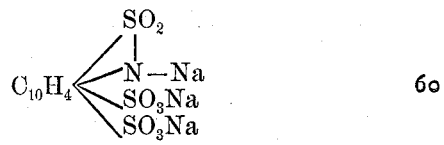

In order to obtain from this product the amidonaphtholdisulfo acid

$(NH_2:SO_3H:SO_3H:OH=1:2:4:8)$, a mixture of one part, by weight, of the sodium salt of the above disulfo acid 2.5 parts by weight, of potash or soda and 0.2 part by weight, of water is heated at about 170° centigrade. When a test portion taken out (after combining with diazo-compounds) no longer shows any increase of the dye-stuffs formed, the melting mass, after cooling, is dissolved in water, and the resulting liquid is acidulated, for instance, with hydrochloric acid. The amidonaphthol disulfo acid then separates in the form of its acid sodium salt, which forms colorless needles grouped in the shape of balls. The above amidonaphthol-disulfo acid

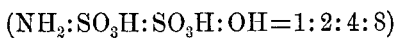
$(NH_2:SO_3H:SO_3H:OH=1:2:4:8)$ possesses the following composition:

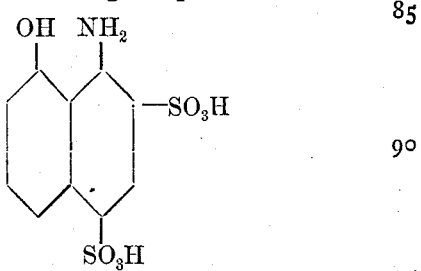

The dye-stuffs resulting from tetrazotized para diamins and the above acid are of great technical value.

In carrying out our invention practically we proceed as follows: 24.4 parts, by weight, of diamidodiphenol dimethylether (or the corresponding quantity of a salt of benzidin, tolidin) are suspended in a state of minute subdivision in five hundred parts, by weight, of water with the addition of seventy parts, by weight, of hydrochloric acid (20° Baumé). While stirring and cooling a solution of 13.8 parts, by weight, of sodium nitrite in one hundred and fifty parts, by weight, of water is added. The resulting solution of tetrazodiphenolether is then allowed to flow into a solution rendered alkaline by sodium carbonate and containing 72.6 parts, by weight of the sodium salt of the above amidonaphtholdisulfo acid

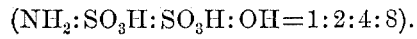
$(NH_2:SO_3H:SO_3H:OH=1:2:4:8)$.

The formation of the dye-stuff which begins immediately is complete after some hours. The coloring-matter formed is salted out by means of common salt, filtered off, pressed and dried. In a similar or analogous manner the process can be performed, if instead of dianisidin other para diamins, as for example benzidin or tolidin, are employed. The aforesaid dye-stuff has the following composition:

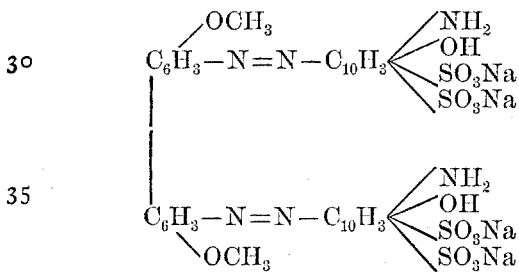

The coloring-matter has the following properties: It forms a bluish-black powder, easily soluble in cold water with a greenish-blue color, soluble in concentrated sulfuric acid (60° Baumé) with a green color turning into blue on the addition of ice-water to the sulfuric acid solution, insoluble in alcohol. It produces an unmordanted cotton bright blue shades which are fast against the action of alkalies. The dye-stuff when fixed on the fiber can be diazotized and the resulting diazo product can be directly on the fiber coupled with the so called developers, shades being thus produced which are distinguishable by their great intensity.

Having now described our invention and in what manner it can be performed, what we claim as new, and desire to secure by Letters Patent, is—

1. The process for the production of blue coloring-matters by acting with one molecular proportion of a tetrazo compound of a para-diamines on two molecular proportions of the sodium salt of amidonaphtholdisulfo acid

$(NH_2:SO_3H:SO_3H:OH=1:2:4:8)$ in an alkaline solution.

2. As a new article of manufacture the dye stuff having (in case the tetrazo derivative of dianisidin is employed) the formula:

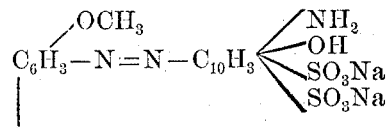

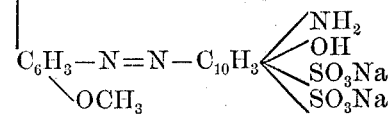

forming a bluish-dark powder, easily soluble in cold water with a greenish-blue color, in concentrated sulfuric acid (60° Baumé) with a green color, turning into blue on the addition of ice-water, insoluble in cold alcohol, almost insoluble in hot alcohol, producing an unmordanted cotton greenish-blue shades fast against the action of alkalies.

In testimony whereof we have signed our names in the presence of two subscribing witnesses.

RICHARD KOTHE.
MORITZ ULRICH.
OSCAR DRESSEL.

Witnesses:
WILLIAM ESSENWEIN,
T. H. STRAUSS.

Corrections in Letters Patent No. 511,532.

It is hereby certified that in Letters Patent No. 511,532, granted December 26, 1893, upon the application of Richard Kothe, Moritz Ulrich, and Oscar Dressel, of Elberfeld, Germany, for an improvement in "Blue Dye," errors appear in the printed specification requiring correction, as follows: On page 2, in line 60, the letter "a" preceding the word "paradiamines" should read *the;* in line 85 the word "an" should read *on;* and that said Letters Patent should be read with these corrections therein that the same may conform to the record of the case in the Patent Office.

Signed, countersigned, and sealed this 16th day of January, A. D. 1894.

[SEAL.]

JNO. M. REYNOLDS,
*Assistant Secretary of the Interior.*

Countersigned:
    JOHN S. SEYMOUR,
        *Commissioner of Patents.*